US010102045B2

(12) United States Patent
Maki et al.

(10) Patent No.: US 10,102,045 B2
(45) Date of Patent: Oct. 16, 2018

(54) CONTROL DEVICE, CONTROL METHOD AND PROGRAM

(71) Applicant: OMRON Corporation, Kyoto (JP)

(72) Inventors: Noriyuki Maki, Uji (JP); Shuhei Miyaguchi, Otsu (JP); Yoshitaka Takeuchi, Otsu (JP); Fred Scheffer, Den Bosch (NL); Thorstin Crijns, Son en Breugel (NL)

(73) Assignee: OMRON Corporation, Kyoto (JP)

( * ) Notice: Subject to any disclaimer, the term of this patent is extended or adjusted under 35 U.S.C. 154(b) by 70 days.

(21) Appl. No.: 15/473,640

(22) Filed: Mar. 30, 2017

(65) Prior Publication Data

US 2017/0293509 A1 Oct. 12, 2017

(30) Foreign Application Priority Data

Apr. 7, 2016 (JP) ................. 2016-077606

(51) Int. Cl.
G06F 9/54 (2006.01)
G06F 9/48 (2006.01)
G06F 9/4401 (2018.01)

(52) U.S. Cl.
CPC .............. G06F 9/542 (2013.01); G06F 9/442 (2013.01); G06F 9/485 (2013.01)

(58) Field of Classification Search
None
See application file for complete search history.

(56) References Cited

U.S. PATENT DOCUMENTS

| 5,793,124 A | 8/1998 | Mitzaki |
| 6,178,515 B1 | 1/2001 | Hayashi et al. |
| 6,230,181 B1 * | 5/2001 | Mitchell ................. G06F 9/442 714/E11.138 |

(Continued)

FOREIGN PATENT DOCUMENTS

| JP | H11134073 | 5/1999 |
| JP | 2005004381 | 1/2005 |
| JP | 2005275818 | 10/2005 |

OTHER PUBLICATIONS

"Search Report of Europe Counterpart Application", dated Jul. 7, 2017, p. 1-p. 11.

Primary Examiner — Craig C Dorais
(74) Attorney, Agent, or Firm — JCIPRNET

(57) ABSTRACT

A control device for controlling equipment or a machine includes: one or more processors, a general-purpose OS and a real-time OS executed in parallel on the one or more processors, and an input interface that receives a cutoff event from outside, wherein the real-time OS provides an execution environment of a user program for realizing control over the equipment or machine. The real-time OS has a function of executing a shutdown preparation process required for shutdown of the real-time OS in response to the cutoff event; a function of instructing the general-purpose OS to shut down after executing the shutdown preparation process; and a function of completing the shutdown of the real-time OS and cutting off power supply of the control device when a predetermined condition is satisfied, wherein the predetermined condition includes receipt of a notification of shutdown completion from the general-purpose OS.

8 Claims, 10 Drawing Sheets

(56) References Cited

U.S. PATENT DOCUMENTS

| 2003/0225479 A1* | 12/2003 | Waled | B25J 9/161 |
| | | | 700/245 |
| 2013/0125118 A1* | 5/2013 | Niesser | G06F 9/455 |
| | | | 718/1 |
| 2014/0282507 A1 | 9/2014 | Plondke et al. | |
| 2016/0092242 A1 | 3/2016 | Krishnamoorthy et al. | |

* cited by examiner

CONTROL DEVICE, CONTROL METHOD AND PROGRAM

CROSS-REFERENCE TO RELATED APPLICATION

This application claims the priority benefit of Japan application serial no. 2016-077606, filed on Apr. 7, 2016. The entirety of the above-mentioned patent application is hereby incorporated by reference herein and made a part of this specification.

BACKGROUND OF THE DISCLOSURE

Field of the Disclosure

This technique relates to a control device, a control method, and a program, by which a plurality of operating systems (OS) are executed with use of common hardware resources.

Description of Related Art

With the advances in information and communication technology (ICT) in recent years, reliability of general-purpose computing devices is increasing. In factory automation (FA) related devices for controlling equipment or a machine, introduction of such general-purpose computing devices is in progress. When such general-purpose computing devices are used, it is preferable to adopt highly reliable software for processing related to the equipment or machine. On the other hand, for processing related to user operations, using general-purpose software can improve the operability, etc.

Therefore, a system using two operating systems (abbreviated as "OS" hereinafter), i.e., a highly reliable OS and a versatile general-purpose OS, has been proposed.

For example, Japanese Patent Publication No. 2005-275818 (Patent Literature 1) discloses an electronic apparatus composed of two systems that are connected by communication means. In addition, Japanese Patent Publication No. 2005-004381 (Patent Literature 2) discloses a multi-CPU device that includes a master CPU block and a slave CPU block.

In the configurations respectively disclosed in Patent Literature 1 and Patent Literature 2, normally, the two devices are executed in parallel, and when abnormality occurs, the two devices would both be stopped. From the viewpoint of stopping such devices, Patent Literature 1 discloses a configuration, in which an abnormality detection part disposed only in one system outputs a shutdown command to the other system. Patent Literature 2 discloses a configuration that a real-time OS shuts down a general-purpose OS when a source power supply stops supplying power.

In regard to the shutdown process performed when the power supply is stopped, Japanese Patent Publication No. H11-134073 (Patent Literature 3) discloses an OS shutdown method for multiple servers that receive power supply from an uninterruptible power supply device.

PRIOR ART LITERATURE

Patent Literature

Patent Literature 1: Japanese Patent Publication No. 2005-275818

Patent Literature 2: Japanese Patent Publication No. 2005-004381

Patent Literature 3: Japanese Patent Publication No. H11-134073

SUMMARY OF THE DISCLOSURE

Problem to be Solved

As the ICT advances, the processing speed of computing devices is improved and the so-called virtualization technology is developing, which realizes OS environments independent of one another and executes different applications respectively in the OS environments by using common hardware resources. By using such virtualization technology, it is possible to reduce the equipment cost.

The above-mentioned Patent Literatures 1 to 3 merely disclose techniques related to shutdown that is performed when multiple independent devices (CPUs) are executed in parallel and give no consideration to the virtualization technology.

There is a demand for a configuration that is capable of safely shutting down a control device using the virtualization technology.

Solution to the Problem

A control device for controlling equipment or a machine according to an aspect of this technique includes: one or more processors, a general-purpose operating system (OS) and a real-time operating system (OS) executed in parallel on the one or more processors, and an input interface that receives a cutoff event from outside, wherein the real-time OS provides an execution environment of a user program for realizing control over the equipment or machine. The real-time OS has a function of executing a shutdown preparation process required for shutdown of the real-time OS in response to the cutoff event, a function of instructing the general-purpose OS to shut down after executing the shutdown preparation process, and a function of completing the shutdown of the real-time OS and cutting off power supply of the control device when a predetermined condition is satisfied, wherein the predetermined condition includes receipt of a notification of shutdown completion from the general-purpose OS.

Preferably, the real-time OS cuts off the power supply of the control device without receiving the notification of shutdown completion from the general-purpose OS when a predetermined period has passed since the general-purpose OS is instructed to shut down.

Preferably, the input interface is configured to receive the cutoff event that an uninterruptible power supply device supplying power to the control device issues when an external power supply supplied to the uninterruptible power supply device is lost. The real-time OS further has a function of notifying the uninterruptible power supply device that the shutdown of the real-time OS has been completed.

Preferably, the real-time OS further has a function of allowing the user program to refer to information indicating whether the cutoff event has been received.

Preferably, the real-time OS executes the shutdown preparation process after the cutoff event is received when a predetermined condition is satisfied, wherein the predetermined condition includes receiving a prescribed notification from the user program.

Preferably, the real-time OS starts the shutdown preparation process when a predetermined period has passed since the user program is instructed to shut down.

A control method for a control device that controls equipment or a machine according to another aspect of this technique includes: a process of executing in parallel a general-purpose operating system (OS) and a real-time OS on one or more processors, wherein the real-time OS provides an execution environment of a user program to realize control over the equipment or the machine; a process that the real-time OS executes a shutdown preparation process required for shutdown of the real-time OS in response to a cutoff event received via an input interface; a process that the real-time OS instructs the general-purpose OS to shut down after executing the shutdown preparation process; and a process that the real-time OS completes the shutdown of the real-time OS and cuts off power supply of the control device when a predetermined condition is satisfied, wherein the predetermined condition includes receipt of a notification of shutdown completion from the general-purpose OS.

According to yet another aspect of this technique, a program is provided, which includes a real-time operating system (OS) that constructs an environment for controlling equipment or a machine according to a user program that is prepared in advance. The real-time OS is executed in parallel with a general-purpose OS on one or more processors. The program enables a computer to execute: a process of executing a shutdown preparation process required for shutdown of the real-time OS in response to a cutoff event received via an input interface; a process of instructing the general-purpose OS to shut down after executing the shutdown preparation process; and a process of completing the shutdown of the real-time OS and cutting off power supply when a predetermined condition is satisfied, wherein the predetermined condition includes receipt of a notification of shutdown completion from the general-purpose OS.

Effects of the Disclosure

According to this technique, the control device that uses the virtualization technology can be shut down more safely.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
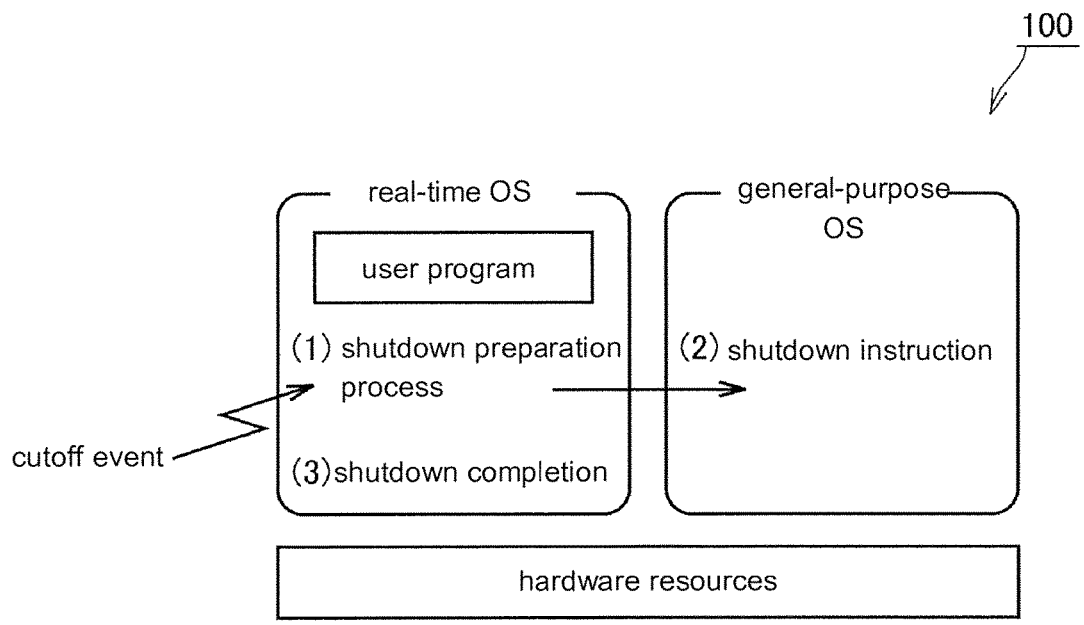
FIG. 1 is a schematic diagram showing an overview of the control device according to the present embodiment.

Embodiments of the disclosure are described in detail below with reference to the figures. In the figures, the same or corresponding parts are denoted by the same reference numerals and descriptions thereof will not be repeated.

A. Overview

An overview of a control device 100 according to the present embodiment is described first. FIG. 1 is a schematic diagram showing the overview of the control device 100 according to the present embodiment.

With reference to FIG. 1, in the control device 100, a real-time OS and a general-purpose OS are executed in parallel on common hardware resources including one or more processors, wherein the real-time OS provides an execution environment of a user program for achieving control over equipment or a machine. The control device 100 has an interface that receives a cutoff event from outside.

In this specification, the "cutoff event" refers to an arbitrary event that triggers the control device 100 to start a process of shutting down or cutting off power supply, and typically may include an event from an uninterruptible power supply device 200, a user's operation of a power button, etc., as will be described later.

The real-time OS and the general-purpose OS shown in FIG. 1 are executed under a virtual environment that uses a hypervisor, etc. The real-time OS is a highly reliable OS and is capable of stably controlling the equipment or machine. The general-purpose OS, on the other hand, is inferior to the real-time OS in terms of reliability, but has high versatility. Thus, the general-purpose OS is capable of executing various general-purpose applications or user applications. Therefore, a system that requires advanced information processing can be constructed at lower costs and in a shorter time. Moreover, connection to an external device via a network is also easy.

When a cutoff event occurs for some reason, it is required to shut down both the OSs safely. Thus, in the present embodiment, the real-time OS takes the initiative to shut down the general-purpose OS and shut down the real-time OS itself. In general, the data handled by the real-time OS has higher priority than the data handled by the general-purpose OS, so the real-time OS plays a leading role to ensure that the data of higher priority is protected.

As a specific shutdown procedure, the real-time OS executes a shutdown preparation process required for shutting down the real-time OS in response to the cutoff event. Subsequently, after executing the shutdown preparation process, the real-time OS instructs the general-purpose OS to shut down. Then, when a predetermined condition including receipt of a notification of shutdown completion from the general-purpose OS is satisfied, the shutdown of the real-time OS itself is completed and the power supply of the control device 100 is cut off. Through such a procedure, the real-time OS and the general-purpose OS can both be shut down safely and reliably.

B. Device Configuration of the Control System

Figure 2:
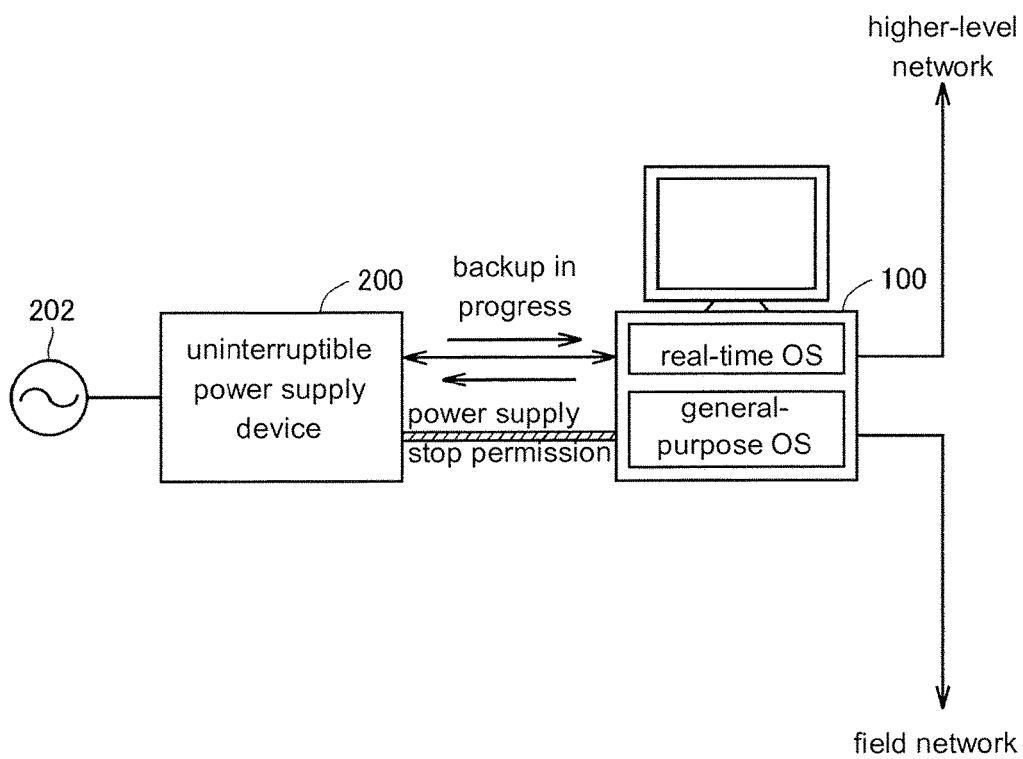
FIG. 2 is a schematic diagram showing an example of the device configuration of the control system according to the present embodiment.

Next, an example of the device configuration of a control system according to the present embodiment is described in further detail. FIG. 2 is a schematic diagram showing an example of the device configuration of a control system 1 according to the present embodiment. With reference to FIG. 2, the control system 1 includes the control device 100 for controlling the equipment or machine, and the uninterruptible power supply device 200 that supplies power to the control device 100.

The control device 100 executes a user program for controlling the equipment or machine. In order to control such equipment or machine, the control device 100 is capable of exchanging field information via a field network, etc., and exchanging data with a server device, etc., on a higher-level network. Such control processing is realized by the real-time OS executed by the control device 100. In the control device 100, the general-purpose OS is executed in addition to the real-time OS, so as to operate an arbitrary general-purpose application.

The uninterruptible power supply (UPS) device 200 includes a power conversion device, a power storage device, etc., and supplies a part of external power supplied from an external power supply (primary power supply) 202 directly to the control device 100 or converts it into predetermined AC power or DC power to be supplied to the control device 100 as secondary power and stores the remaining power in the power storage device. When the power supply from the external power supply is stopped for some reason, supply of the secondary power to the control device 100 is continued by using the power stored in the power storage device. However, since the power that can be stored in the power storage device built in the uninterruptible power supply device 200 is limited, when the power supply from the external power supply is stopped, the uninterruptible power supply device 200 notifies the control device 100 that the external power supply has been stopped and/or the supply of the secondary power will stop after a predetermined time.

Figure 3:
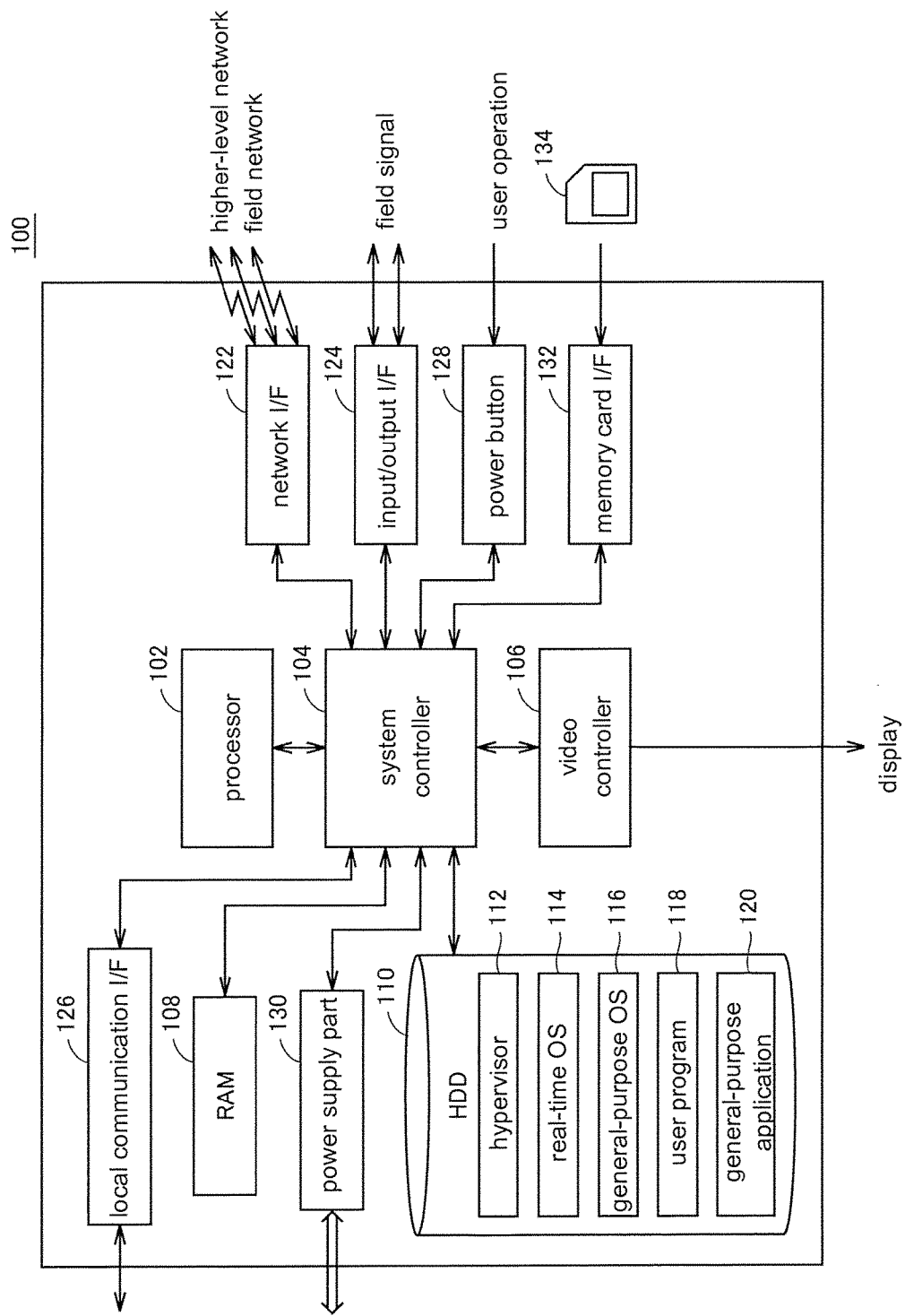
FIG. 3 is a schematic diagram showing an example of the hardware configuration of the control device according to the present embodiment.

Next, an example of a hardware configuration of the control device 100 according to the present embodiment is described. FIG. 3 is a schematic diagram showing an example of the hardware configuration of the control device 100 according to the present embodiment. The control device 100 shown in FIG. 3 is basically constituted by computing elements according to a general-purpose architecture, and has a hardware configuration similar to that of a general-purpose personal computer.

With reference to FIG. 3, the control device 100 includes a processor 102, a system controller 104, a video controller 106, a RAM (random access memory) 108, a HDD (hard disk drive) 110, a network interface (also referred to as "I/F" hereinafter) 122, an input/output interface 124, a local communication interface 126, a power button 128, a power supply part 130, and a memory card interface 132. In the control device 100, a virtualization environment enabling a plurality of OSs to be executed independently of one another is realized by using common hardware resources.

The processor 102 is an arithmetic logic unit that executes various programs, and typically may include a CPU (central processing unit), an MPU (micro processing unit), a GPU (graphics processing unit), etc. A plurality of the processors 102 may be implemented, or a plurality of arithmetic cores may be implemented in one single processor 102. That is, it may be a so-called multiprocessor or a multicore processor.

The system controller 104 is a circuit that controls and mediates exchange of internal commands or data between the processor 102 and the peripheral devices, and is typically implemented by LSI (large scale integration), etc.

The video controller 106 is connected to a display, etc., and visually outputs a calculation result, etc., provided by the control device 100.

The RAM 108 temporarily stores work data required for executing a program in the processor 102, data acquired through exchange with the outside, etc. The RAM 108 is typically implemented by a volatile memory device, such as DRAM (dynamic random access memory) or SRAM (static random access memory).

The HDD 110 is a storage device that stores a program executed by the processor 102 or data generated by execution of the program in the processor 102 in a non-volatile manner. A storage device such as an SSD (solid state drive) or an optical disk may be used, instead of or in addition to the HDD 110. To facilitate the explanation, FIG. 3 depicts the HDD 110 as a single storage device, but a plurality of storage devices may be combined according to the data to be stored. For example, storage devices (e.g., HDD) may be prepared separately for storing the real-time OS 114 and the general-purpose OS 116. By using such a configuration, for example, even if the storage device that stores the general-purpose OS 116 fails, the real-time OS 114 is able to continue with the control.

Typically, a hypervisor 112, the real-time OS (operating system) 114, the general-purpose OS 116, a user program 118, and a general-purpose application 120 are stored in the HDD 110.

As will be described later, the hypervisor 112 is a managing program for executing a plurality of OSs independently of one another by using the common hardware resources. The hypervisor 112 manages the hardware resources allocated to the real-time OS 114 and the general-purpose OS 116. The hypervisor 112 provides virtual hardware resources to each OS, and from the aspect of each OS, is capable of executing the same processing as that using normal hardware resources.

The real-time OS 114 is a program that is executed by using the hardware resources of the control device 100 and provides the execution environment of the user program for controlling the equipment or machine. The real-time OS 114 realizes the same function as the conventional PLC (programmable logic controller) by managing an execution cycle of the necessary process with use of a scheduler. That is, in this specification, the "real-time OS" refers to a program that realizes an environment for the user program to be executed in a specified cycle, and refers to an entire program that provides various libraries, functions, etc., required for executing the user program (executable form) as the control device.

The general-purpose OS 116 is executed by using the hardware resources of the control device 100 and operates independently of the real-time OS 114. The general-purpose OS 116 is an OS executed by a general personal computer, etc., and may be Windows (registered trademark), Mac OS (registered trademark), UNIX (registered trademark), LINUX (registered trademark), Android (registered trademark), MS-DOS (registered trademark), or other arbitrary OSs derived from UNIX, for example.

The user program 118 is an arbitrary control program executed by the real-time OS 114. When the real-time OS provides the function of an interpreter, the user program 118 may be stored in the form of a source code or an intermediate code, or may be stored in an executable state, such as an object form.

The general-purpose application 120 is an arbitrary application executed on the general-purpose OS 116, and may include an application that is incorporated as a part of the general-purpose OS 116, an arbitrary commercially-available application, an original application created by the user, etc.

The network interface 122 is an interface for exchanging data with other devices, and may include a port for connecting to a higher-level computer or a higher-level network, a port for connecting to various field devices via a field network or a field bus, a port for exchanging data with other control devices, etc., for example. The network interface 122 is capable of using a device according to an arbitrary standard, and may be either a wired system, such as Ethernet (registered trademark) and EtherCAT (registered trademark), or a wireless system, such as wireless LAN (local area network) and Bluetooth (registered trademark), for example. The network interface 122 is available for both the real-time OS 114 and the general-purpose OS 116, and the OSs are both capable of exchanging data with other devices via the network interface 122.

The input/output interface 124 corresponds to an input/output unit disposed in the PLC, and exchanges field signals (digital input/output signals, analog input/output signals, pulse signals, etc.) with a field apparatus.

The local communication interface 126 corresponds to an input interface that receives the cutoff event from the outside and includes an arbitrary communication interface. Typically, the local communication interface 126 includes a USB (universal serial bus), parallel communication, serial communication such as RS-232C, etc., and exchanges data with a peripheral device, such as the uninterruptible power supply device 200 shown in FIG. 2, a printer, etc. That is, the local communication interface 126 receives the cutoff event that is issued when the uninterruptible power supply device 200 that supplies power to the control device 100 has lost the external power supply supplied to the uninterruptible power supply device 200.

A signal indicating the cutoff event may be received via the input/output interface 124, or the input/output interface 124 and the local communication interface 126 may both be used.

The power button 128 generates an instruction for controlling power on/off of the control device 100 according to a user operation.

The power supply part 130 converts the power supplied from the uninterruptible power supply device 200 to a predetermined voltage and supplies the same to each part. Typically, the power supply part 130 includes a switching regulator, etc.

The memory card interface 132 writes/reads data to/from a memory card 134 (e.g., a SD card, etc.).

C. Software Configuration of the Control Device

Figure 4:
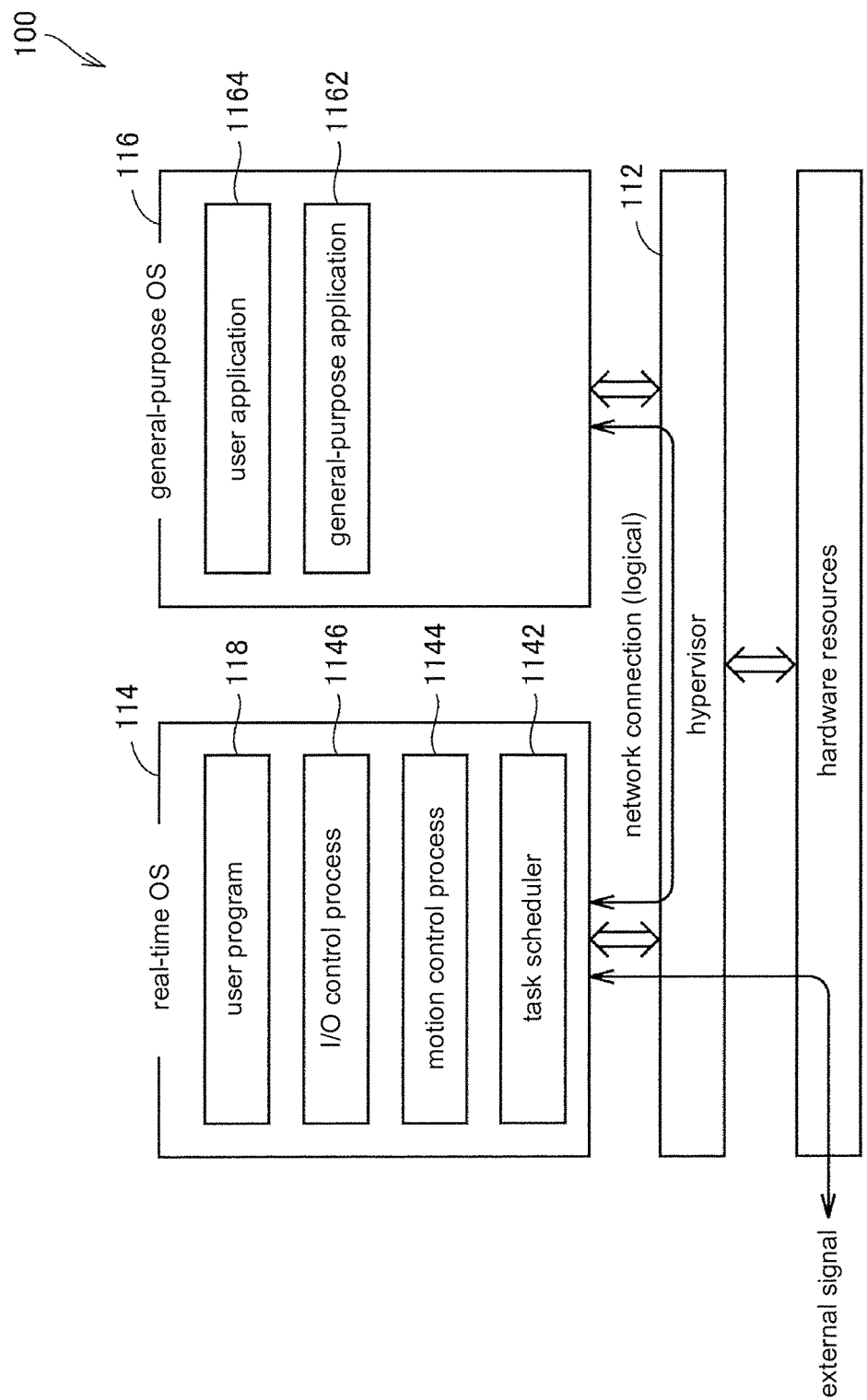
FIG. 4 is a schematic diagram showing an example of the software configuration of the control device according to the present embodiment.

Next, an example of a software configuration of the control device 100 is described. FIG. 4 is a schematic diagram showing an example of the software configuration of the control device 100 according to the present embodiment.

With reference to FIG. 4, in the control device 100, the hypervisor 112 manages the hardware resources of the control device 100 and allocates these hardware resources to the real-time OS 114 and the general-purpose OS 116 while mediating these hardware resources, so that the real-time OS 114 and the general-purpose OS 116 are executed independently of each other on the common hardware resources. That is, the hypervisor 112 is used to realize the virtualization environment for executing a plurality of different OSs. Between the real-time OS 114 and the general-purpose OS 116, a logical network is configured via the hypervisor 112.

In the real-time OS 114, the user program 118 is executed. In executing the user program 118, a task scheduler 1142, a motion control process 1144, and an I/O (input/output) control process 1146 are linked. The user program 118 is a control program for controlling the equipment or machine, and is arbitrarily created according to the equipment or machine, i.e., the control target. Typically, the user program 118 includes sequence control and motion control commands. The user program 118 can be created in an arbitrary language, and can use a ladder program, ST language, C language, a function block command, etc., for example. Typically, the user program 118 is converted to an executable form in advance, and a code of the executable form is linked to the task scheduler 1142, the motion control process 1144, and the I/O control process 1146, and repeats acquisition of the signal from the control target, execution of the control logic, and reflection of the execution result (control of an actuator).

The task scheduler 1142 controls the execution cycle or execution timing for each task included in the user program 118. The motion control process 1144 executes various numerical operations (floating-point operation, etc.) required for motion control. The I/O control process 1146 is responsible for a process of exchanging various signals with the control target.

In the general-purpose OS 116, an arbitrary user application 1164 and a general-purpose application 1162 are executed.

Typically, the user application 1164 is an application created by a development vendor, etc., of the user program 118 executed by the real-time OS 114, and executes a process of acquiring and/or providing data related to a processing result of the user program 118 and/or data required for processing. For example, the user program 118 accesses a database of a higher-level server device to exchange data related to the processing in the user program 118 or provides an operator, etc., of the control device 100 a user interface screen related to the operation on the control device 100.

The general-purpose application 1162 is a standard application executable by the general-purpose OS 116, and is capable of constructing a system with fewer man-hours with use of general-purpose processing or functions by linkage with the user application 1164.

Here, the control device 100 handles various data, but typically it can be roughly divided into system data and user data.

The system data refers to all data required for the operation of the real-time OS 114 or the general-purpose OS 116. If such system data is destroyed, the real-time OS 114 or the general-purpose OS 116 cannot be started up or operated. The system data includes log data generated by the real-time OS 114 and the general-purpose OS 116, and log data (event log) generated by the system. These log data may include data that is made public to the user of the control device 100 and data that is not.

The user data is basically a concept including data other than the system data, and refers to data, etc., created or installed by the user, for example. Typically, such user data includes the user program 118 itself and a production recipe, etc., that defines a process corresponding to a product or a semifinished product produced in the device that is the control target.

D. Shutdown Process

Next, some examples of a shutdown process in the control device 100 according to the present embodiment are described. In the present embodiment, the real-time OS 114 leads the shutdown process. Such a shutdown process is typically started with the cutoff event as a trigger, wherein the cutoff event refers to a notification from the uninterruptible power supply device 200 and pressing of the power button 128 performed by the user of the control device 100.

The user interface screen provided by the general-purpose OS 116 is mainly displayed by the display of the control device 100, but it is preferable not to prepare a menu for shutting down the general-purpose OS 116 on the user interface screen. That is, it is intended to prevent unintentional shutdown caused by the user of the control device 100. Shutdown of the entire control device 100 including the general-purpose OS 116 is managed by the real-time OS 114. Typical processing procedures for the respective cases are described hereinafter.

(d1: Shutdown Caused by the Uninterruptible Power Supply Device 200)

Figure 5:
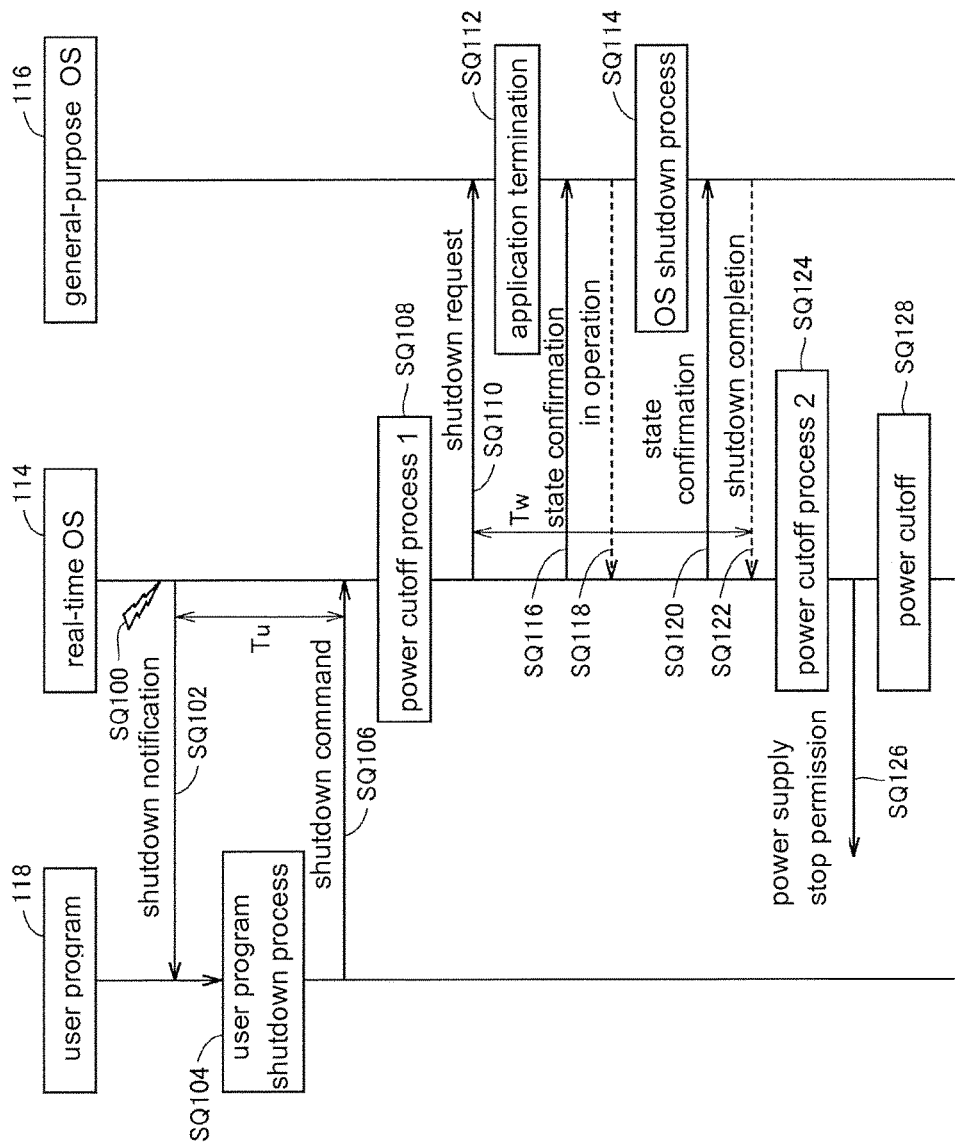
FIG. 5 is a sequence diagram showing a processing procedure of the shutdown process in the control device according to the present embodiment.

FIG. 5 is a sequence diagram showing a processing procedure of the shutdown process in the control device 100 according to the present embodiment. With reference to FIG. 5, when the power supply from the external power supply to the uninterruptible power supply device 200 stops, the uninterruptible power supply device 200 outputs a shutdown instruction (notification of backup in progress) to the control device 100. This signal is inputted to the control device 100 via the local communication interface 126 or the input/output interface 124. Due to the input of this signal, an external interruption occurs inside the control device 100 (sequence SQ100). Then, the real-time OS 114 outputs a shutdown notification to the user program 118 (sequence SQ102). The notification to the user program 118 is typically performed via a system variable.

With the shutdown notification as a trigger, the user program 118 executes the process required for safe shutdown (sequence SQ104). The shutdown process executed by the user program 118 may include a preparation process for stopping I/O refresh (an update process of the input/output signal) or a process such as completion of a writing process for an external memory. Such a shutdown process is programmed according to contents of the user program 118 respectively. For example, a process for safely stopping the equipment or machine, i.e., the control target, is executed. In addition, a process for closing an opened file of the production recipe is executed. In this way, when execution of the process for safe shutdown is completed, the real-time OS 114 is notified of the process completion (sequence SQ106). The process completion may be notified in the form of a shutdown command to the real-time OS 114. That is, in response to the shutdown command from the user program 118, the real-time OS 114 starts the shutdown process.

After outputting the shutdown notification to the user program 118 (sequence SQ102), the real-time OS 114 starts the shutdown process of the real-time OS 114 itself with the following as a trigger: the shutdown command from the user program 118 has been received or the time that has passed since the shutdown notification has exceeded a timeout time Tu. In this way, the real-time OS 114 monitors the time that has passed since the shutdown notification is outputted to the user program 118 (sequence SQ102).

A power cutoff process 1 and a power cutoff process 2 are set to be executed as the shutdown process of the real-time OS 114. Nevertheless, the power cutoff process may be executed at a time or be further divided into multiple steps for execution. Details regarding the power cutoff process 1 and the power cutoff process 2 are described later.

First, when the shutdown command is received from the user program 118 or when the time that has passed since the shutdown notification exceeds the timeout time Tu, the real-time OS 114 starts the power cutoff process 1 (sequence SQ108). After completing execution of the power cutoff process 1, the real-time OS 114 outputs a shutdown request to the general-purpose OS 116 (sequence SQ110).

In response to the shutdown request from the real-time OS 114, the general-purpose OS 116 terminates the application that is being executed (sequence SQ112) and executes the shutdown process of the OS (sequence SQ114). After outputting the shutdown request, the real-time OS 114 confirms the state of the general-purpose OS 116 (sequences SQ116 and SQ120). If the general-purpose OS 116 is still in operation (sequence SQ118), the real-time OS 114 waits until the shutdown process in the general-purpose OS 116 is completed. In the process that the real-time OS 114 confirms the state of the general-purpose OS 116, typically, the real-time OS 114 outputs some request or message to the general-purpose OS 116 and determines the state based on whether a response is present and the content. The reason is that, in this state, the general-purpose OS 116 is in the shutdown process and there is no guarantee that the general-purpose OS 116 may respond to the request from the real-time OS 114 completely.

After outputting the shutdown request to the general-purpose OS 116 (sequence SQ110), the real-time OS 114 starts the power cutoff process 2 (sequence SQ124) with the following as a trigger: the shutdown process in the general-purpose OS 116 has been completed or the time that has passed since the output of the shutdown request has exceeded a timeout time Tw. In this way, the real-time OS 114 monitors the time that has passed since the shutdown request is outputted to the general-purpose OS 116 (sequence SQ110). That is, basically the real-time OS 114 starts the power cutoff process 2 with receipt of the notification of shutdown completion from the general-purpose OS as a trigger. However, when a predetermined period (the timeout time Tw) has passed since the general-purpose OS 116 is instructed to shut down, the power supply of the control device 100 is cut off even if the notification of shutdown completion is not received from the general-purpose OS 116.

After completing execution of the power cutoff process 2, the real-time OS 114 outputs a power supply stop permission to the uninterruptible power supply device 200 (sequence SQ126) and cuts off the power supply (sequence SQ128). The power cutoff (sequence SQ128) of the control device 100 is executed via the hypervisor 112. The power supply stop permission outputted in the sequence SQ126 is a signal which notifies the uninterruptible power supply device 200 that there is no problem even if the power supply to the control device 100 is stopped. That is, the real-time OS 114 notifies the uninterruptible power supply device 200 that the shutdown has been completed.

By the processing procedure as described above, the shutdown process caused by the uninterruptible power supply device 200 is completed.

(d2: An Example of the User Program 118)

Figure 6:
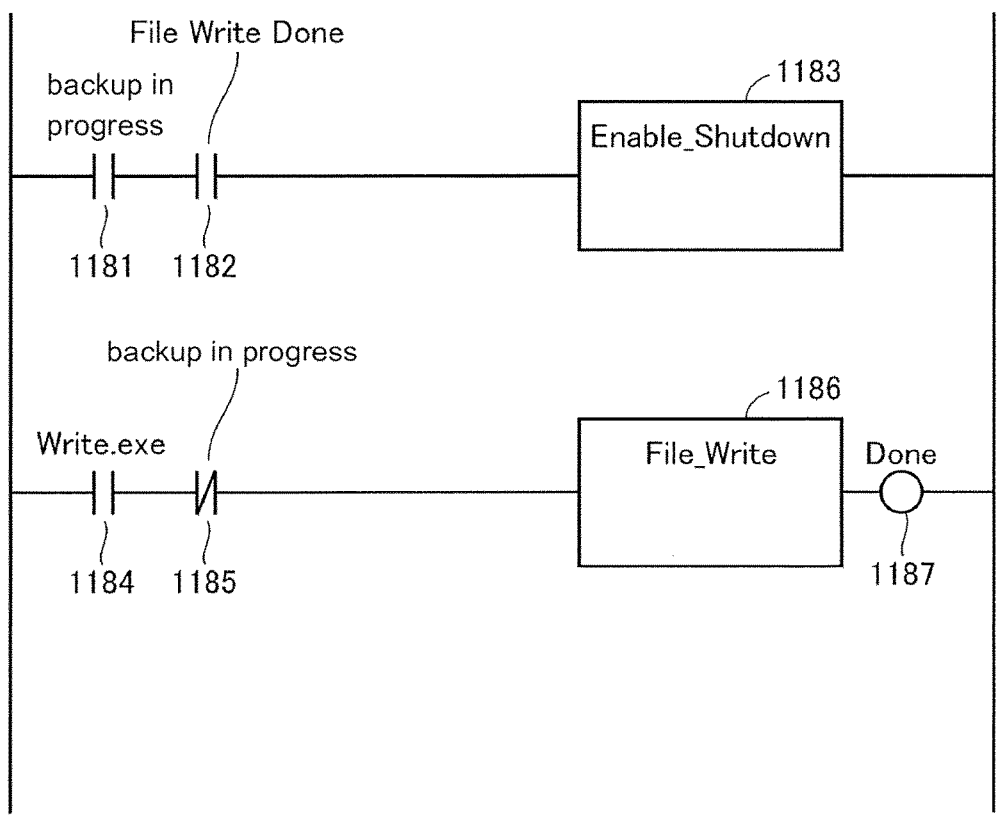
FIG. 6 is a diagram showing an example of the user program in consideration of the shutdown process in the control device according to the present embodiment.

Next, an example of the user program 118 following the sequences shown in FIG. 5 is described. FIG. 6 is a diagram showing an example of the user program 118 in consideration of the shutdown process in the control device 100 according to the present embodiment. The real-time OS 114 has a function of allowing the user program 118 to refer to information that indicates whether the cutoff event has been received, and the user program 118 is capable of executing the process with reference to the information.

The user program 118 shown in FIG. 6 includes a process of outputting completion of the shutdown process from the user program 118 to the real-time OS 114 (sequence SQ106 shown in FIG. 5) and a process of writing data to a memory card, etc.

More specifically, a function block 1183 that issues the shutdown command (Shutdown) to the real-time OS 114 is activated by a logical product of a flag 1181 and a flag 1182, wherein the flag 1181 indicates the state where the power supply from the external power supply to the uninterruptible power supply device 200 is cut off (backup in progress) and the flag 1182 indicates completion of file writing. That is, in the state where the power supply from the external power supply to the uninterruptible power supply device 200 is cut off, when some file writing process is completed and the file is closed, the shutdown command is outputted to the real-time OS 114.

A function block 1186 that executes the process of writing data to a memory card, etc. (File_Write) activates a coil 1187 that indicates completion when the file writing is completed. A value of the flag 1182 indicates a value of the coil 1187. In other words, when the file writing performed by the function block 1186 is completed, the condition for activating the function block 1183 is satisfied.

A logical product of a flag 1184 indicating that a file writing command has been issued and a flag 1185 indicating that backup is not in progress is set as an execution condition of the function block 1186. That is, in the state where the power supply from the external power supply to the uninterruptible power supply device 200 is cut off (backup in progress), even if the file writing command is issued subsequently, the function block 1186 is not executed. In other words, if the instructed file writing is completed right before the state where the power supply from the external power supply to the uninterruptible power supply device 200 is cut off (backup in progress), the shutdown command is outputted from the function block 1183.

By constructing the user program 118 as described above, the data generated in the previous processes can be saved safely even if the power supply from the external power supply to the uninterruptible power supply device 200 is cut off; and the shutdown processes of the real-time OS 114 and general-purpose OS 116 can be started as soon as the saving of the data is completed.

(d3: The Power Cutoff Process in the Real-Time OS 114)

Details regarding the aforementioned power cutoff processes (the power cutoff process 1 and the power cutoff process 2) are described below.

The power cutoff process 1 corresponds to the shutdown preparation process required for shutting down the real-time OS 114, and specifically includes the following processes.

(1) Execution of the user program 118 is interrupted.

(2) Regarding I/O refresh (the update process of the input/output signal), signal output to the actuator is stopped and data update via the field network is stopped.

(3) Regarding access to the external memory card 134, even during writing, the writing is interrupted to close the file, and then the mount is released.

(4) Regarding access to a shared folder (network drive), even during writing, the writing is interrupted to close the file, and then the mount is released.

(5) If the user program 118, etc., is being transferred, the transfer is interrupted. In this case, it is possible that only a part of the user program 118 has been transferred. Thus, an error is generated at the next power-on so that the user program 118 is not executed.

(6) If the user program 118 is being online edited, the online editing is interrupted. At the next power-on, an error is generated to urge the user to perform a recovery process on inconsistency of the data, etc.

(7) The current value of the variable, in which a holding attribute has been set, is backed up to the non-volatile memory area.

After receiving the cutoff event, if the predetermined condition which includes receipt of a prescribed notification from the user program 118 is satisfied, the real-time OS 114 executes the power cutoff process 1, i.e., the shutdown preparation process. However, as will be described later, the time allowed for the entire shutdown process is limited. Therefore, if the predetermined period (the timeout time Tu) has passed since the user program 118 is instructed to shut down, the real-time OS 114 starts the power cutoff process 1 (the shutdown preparation process).

Further, in the power cutoff process 2, the following processes are executed.

(1) Regarding access to a built-in memory card (or an auxiliary storage device), even during writing, the writing is interrupted to close the file, and then the mount is released.

(2) An event log that has recorded the time of occurrence of the power cutoff, etc., is backed up to the non-volatile memory area.

In the processing procedure shown in FIG. 5, the aforementioned power cutoff processes (the power cutoff process 1 and the power cutoff process 2) are executed before the shutdown request is outputted to the general-purpose OS 116 and after the shutdown process in the general-purpose OS 116 is completed respectively. These processes may be simultaneously executed after the shutdown process in the general-purpose OS 116 is completed. However, these processes are preferably executed in two steps as shown in FIG. 5 for the following reason.

That is, in the case where there is an application, which requires a long time until the termination process is reached, among the applications (the user application 1164 or the general-purpose application 1162) executed in the general-purpose OS 116, or in the case where one of the applications freezes in the termination process, it is possible that the real-time OS 114 may continue to wait for completion of the shutdown process from the general-purpose OS 116 and not proceed with the shutdown process.

Moreover, in the case where the power storage device of the uninterruptible power supply device 200 does not have a sufficient power storage amount, if a longer time is required to wait for completion of the shutdown process of the general-purpose OS 116, it is possible that the power supply from the uninterruptible power supply device 200 may be stopped during the shutdown of the general-purpose OS 116 or the real-time OS 114.

Considering the possibility of losing data during such shutdown processes, the power cutoff process is executed in the real-time OS 114 where possible, before the shutdown request is outputted to the general-purpose OS 116. That is, in order to reduce the risk of losing data, the data whose saving target has been determined is stored in the safe area as early as possible. However, in order to retain the event log, etc., of the general-purpose OS 116, the power cutoff process 2 is executed after completion of the shutdown process from the general-purpose OS 116.

The following two-stage process may also be adopted: that is, the process of storing the event log is executed in the power cutoff process 1 as well, and in the power cutoff process 2, only the event log that is newly generated after execution of the power cutoff process 1 is additionally stored. By adopting the process of storing the event logs in two stages, at least the event log in the stage right before output of the shutdown request to the general-purpose OS 116 can be saved.

(d4: Setting of the Timeout Time)

Next, an example of setting the timeout times Tu and Tw shown in FIG. 5 is described. The timeout times Tu and Tw are times for waiting for completion of the shutdown process, and are set respectively by predicting the times that are required until the shutdown processes of the user program 118 and the general-purpose OS 116 are completed.

The timeout time Tu is set by estimating the time required for the shutdown process of the user program 118 (e.g., the termination process of a control program, stop of data logging, stop of I/O refresh). For example, it may be set to a value in a range of 1 to 30 seconds.

The timeout time Tw is set by totaling the time required for terminating the application that is being executed by the general-purpose OS 116 and the time required for shutting down the general-purpose OS 116 itself. For example, it may be set to a value in a range of 30 to 300 seconds.

Such timeout times may be set arbitrarily by the user with use of a setting tool connected to the control device 100. Specifically, the timeout times Tu and Tw are set to exceed a minimum time required for the shutdown process of each system but be less than an allowable maximum time. Here, the allowable maximum time is set to be less than a time during which the uninterruptible power supply device 200 is capable of supplying power alone after the power supply from the external power supply is stopped.

It is also possible to set only the maximum value of the time required for the entire shutdown process executed in the control device 100, so as to dynamically determine the timeout times Tu and Tw according to the set maximum value.

(d5: When the Timeout Time Tw has Exceeded)

If there is no notification of completion of the shutdown process from the general-purpose OS 116 even when the timeout time Tw has exceeded after the real-time OS 114 outputs the shutdown request to the general-purpose OS 116, the real-time OS 114 forcibly shuts down the general-purpose OS 116.

Figure 7:
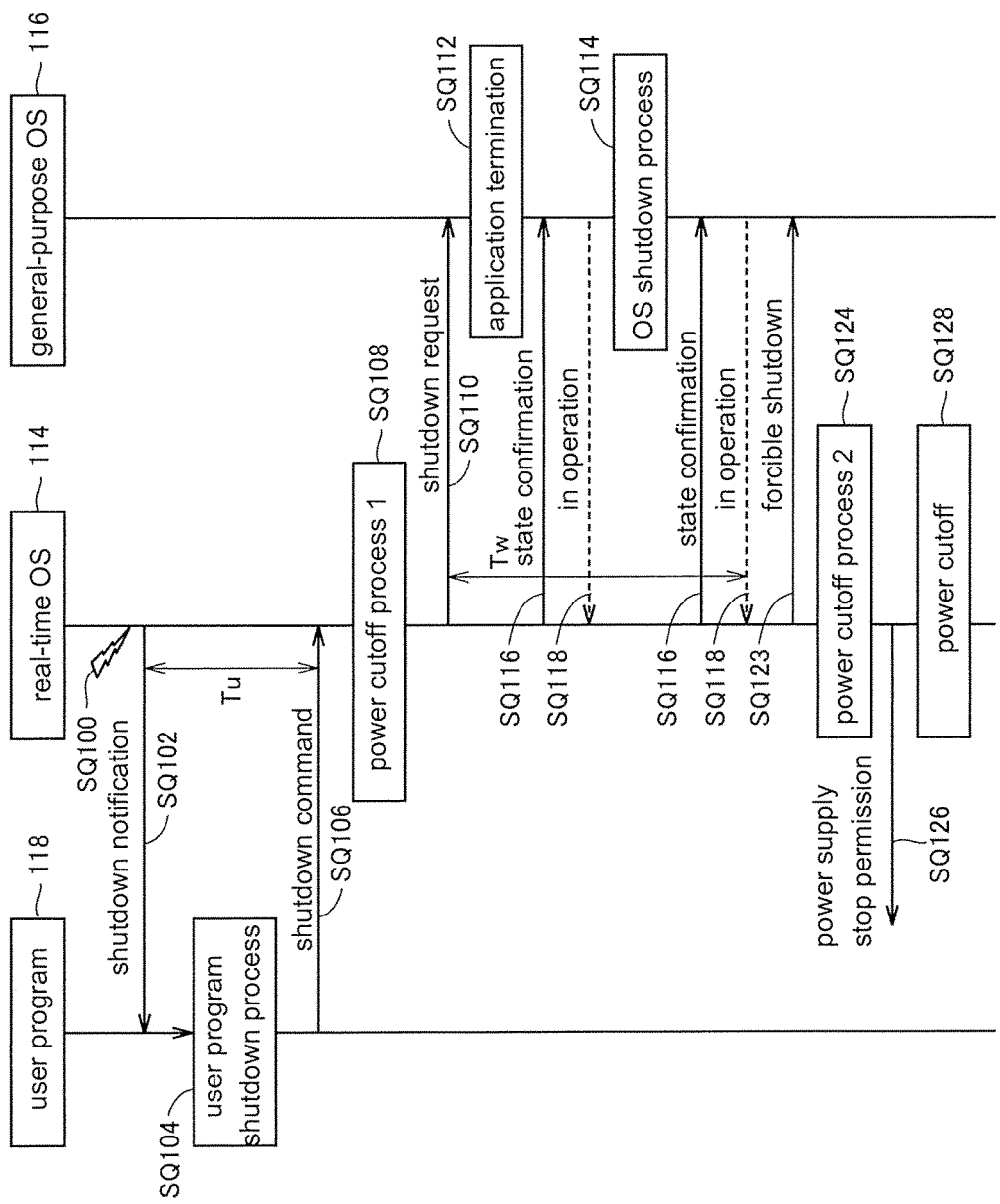
FIG. 7 is a sequence diagram showing another processing procedure of the shutdown process in the control device according to the present embodiment.

FIG. 7 is a sequence diagram showing another processing procedure of the shutdown process in the control device 100 according to the present embodiment. With reference to FIG. 7, after outputting the shutdown request to the general-purpose OS 116 (sequence SQ110), the real-time OS 114 confirms the state of the general-purpose OS 116 (sequence SQ116). Even though when the timeout time Tw has exceeded, if the general-purpose OS 116 is still in operation, the real-time OS 114 forcibly shuts down the general-purpose OS 116 (sequence SQ123).

Due to such forcible shutdown, it is possible that a part of the system data of the application executed on the general-purpose OS 116 is not saved, but it is considered that there is no substantial influence on the user program 118 executed on the real-time OS 114 after the next power-on. Therefore, considering the damage to the control device 100 due to cutoff of the power supply from the uninterruptible power supply device 200, if the shutdown process cannot be completed when the timeout time Tw has exceeded, the general-purpose OS 116 is forcibly shut down.

(d6: Shutdown Caused by the Power Button 128)

Next, the shutdown process that is executed when the user of the control device 100 presses the power button 128 is described. The shutdown process that is executed when the power button 128 is pressed is the same as the shutdown process that is executed due to the notification from the uninterruptible power supply device 200. However, in the case where the power button 128 is pressed, the power supply to the control device 100 is normally continued. Therefore, the timeout times for the user program 118 and the general-purpose OS 116 may not be taken into consideration.

Figure 8:
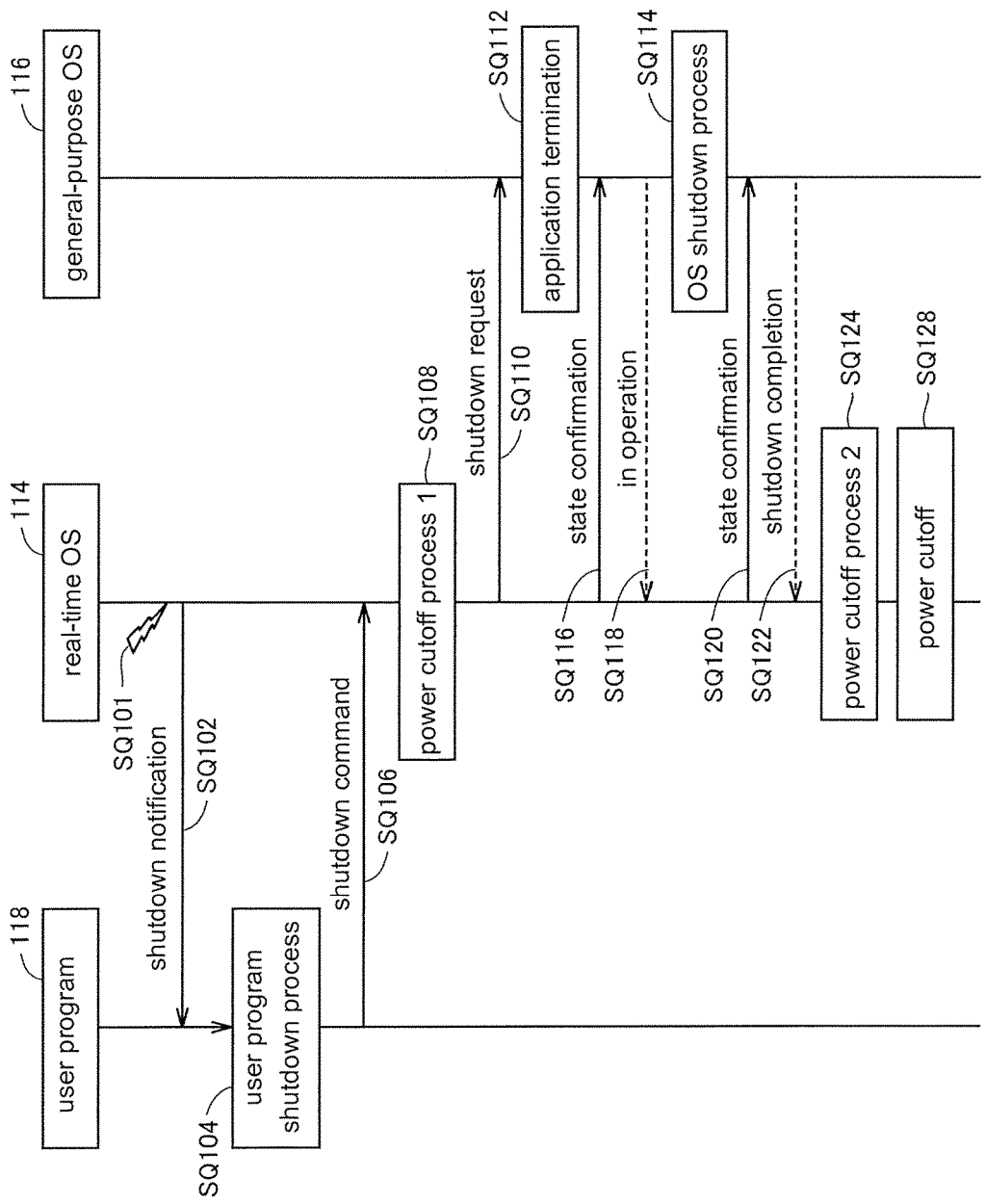
FIG. 8 is a sequence diagram showing yet another processing procedure of the shutdown process in the control device according to the present embodiment.

FIG. 8 is a sequence diagram showing yet another processing procedure of the shutdown process in the control device 100 according to the present embodiment. With reference to FIG. 8, when the user of the control device 100 presses the power button 128, an external interruption occurs inside the control device 100 (sequence SQ101). Then, the real-time OS 114 starts the shutdown process. This shutdown process is the same as the shutdown process shown in FIG. 5. However, in the shutdown process that is started when the power button 128 is pressed, the timeout times Tu and Tw are not set, or the time is set longer than the time in the case of FIG. 5.

That is, the real-time OS 114 eases the time limit for waiting for output of the shutdown command from the user program 118 and completion of the shutdown in the general-purpose OS 116. Thereby, in the control device 100, complete execution of the shutdown processes of the user program 118 and the general-purpose OS 116 is ensured. In other words, the executed shutdown process is the same as that of a normal personal computer, on which the general-purpose OS 116 is executed.

As described above, when the power button 128 is pressed, the shutdown process is guaranteed to be executed more reliably and safely.

(d7: Processing Procedure of the Real-Time OS 114)

Figure 9:
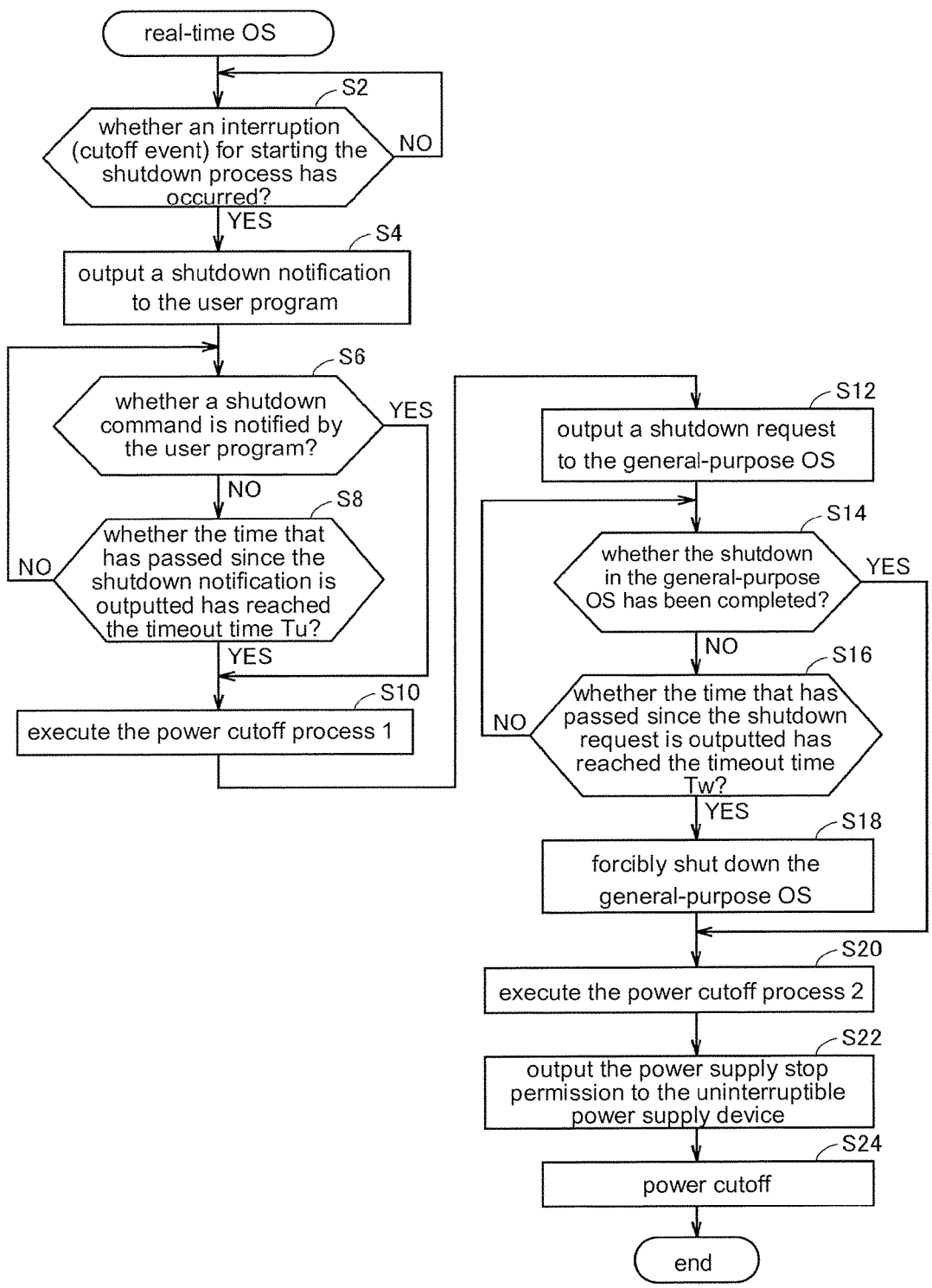
FIG. 9 is a flowchart showing a processing procedure executed by the real-time OS of the control device according to the present embodiment.

Next, the processing procedure executed by the real-time OS 114 of the control device 100 according to the present embodiment is described. FIG. 9 is a flowchart showing the processing procedure executed by the real-time OS 114 of the control device 100 according to the present embodiment. Each of the steps shown in FIG. 9 is realized by the processor 102 by executing a code of the real-time OS 114.

With reference to FIG. 9, the processor 102 determines whether an interruption (cutoff event) for starting the shutdown process has occurred (Step S2). If the interruption for starting the shutdown process has not occurred (NO in Step S2), the process of Step S2 is repeated.

If the interruption for starting the shutdown process occurs (YES in Step S2), a shutdown notification is outputted to the user program 118 (Step S4). Then, the processor 102 determines whether a shutdown command is notified by the user program 118 (Step S6). If the shutdown command is not notified by the user program 118 (NO in Step S6), the processor 102 determines whether the time that has passed since the shutdown notification is outputted has reached the timeout time Tu (Step S8). If the time that has passed since the shutdown notification is outputted does not reach the timeout time Tu (NO in Step S8), the processes in and after Step S6 are repeated.

On the other hand, if the shutdown command is notified by the user program 118 (YES in Step S6) or the time that has passed since the shutdown notification is outputted has reached the timeout time Tu (YES in Step S8), the processor 102 executes the power cutoff process 1 (Step S10), and subsequently outputs the shutdown request to the general-purpose OS 116 (Step S12).

Then, the processor 102 confirms the state of the general-purpose OS 116 and determines whether the shutdown in the general-purpose OS 116 has been completed (Step S14). If the shutdown in the general-purpose OS 116 is not completed (NO in Step S14), the processor 102 determines whether the time that has passed since the shutdown request is outputted has reached the timeout time Tw (Step S16). If the time that has passed since the shutdown request is outputted does not reach the timeout time Tw (NO in Step S16), the processes in and after Step S14 are repeated.

If the shutdown in the general-purpose OS 116 has been completed (YES in Step S14), the processor 102 executes the power cutoff process 2 (Step S20) and outputs the power supply stop permission to the uninterruptible power supply device 200 (Step S22). Then, the processor 102 cuts off the power supply (Step S24). Then, the series of processes ends.

Moreover, if the time that has passed since the shutdown request is outputted has reached the timeout time Tw (YES in Step S16), the processor 102 forcibly shuts down the general-purpose OS 116 (Step S18), and the processes in and after Step S20 are executed. Then, the series of processes ends.

E. Shutdown Process During System Startup

The above description has illustrated the case where the shutdown process is started while both the real-time OS 114 and the general-purpose OS 116 are in operation. Next, a processing example of shifting to the shutdown process during system startup of the real-time OS 114 and/or the general-purpose OS 116 is described.

The following are assumed to be typical scenarios for shifting to the shutdown process during system startup.

(1) Shutdown Process Before Startup of the Real-Time OS 114

For example, the user of the control device 100 may intentionally press the power button 128 during system startup to start the shutdown process before the startup is completed. Alternatively, the power supply from the external power supply may be stopped during system startup and cause the shutdown process to be started before the startup is completed.

In either case, the event can be detected in the same manner as the aforementioned shutdown process that is executed during operation. In this case, because the user program 118 is not executed, control of the equipment or machine is not started.

Figure 10:
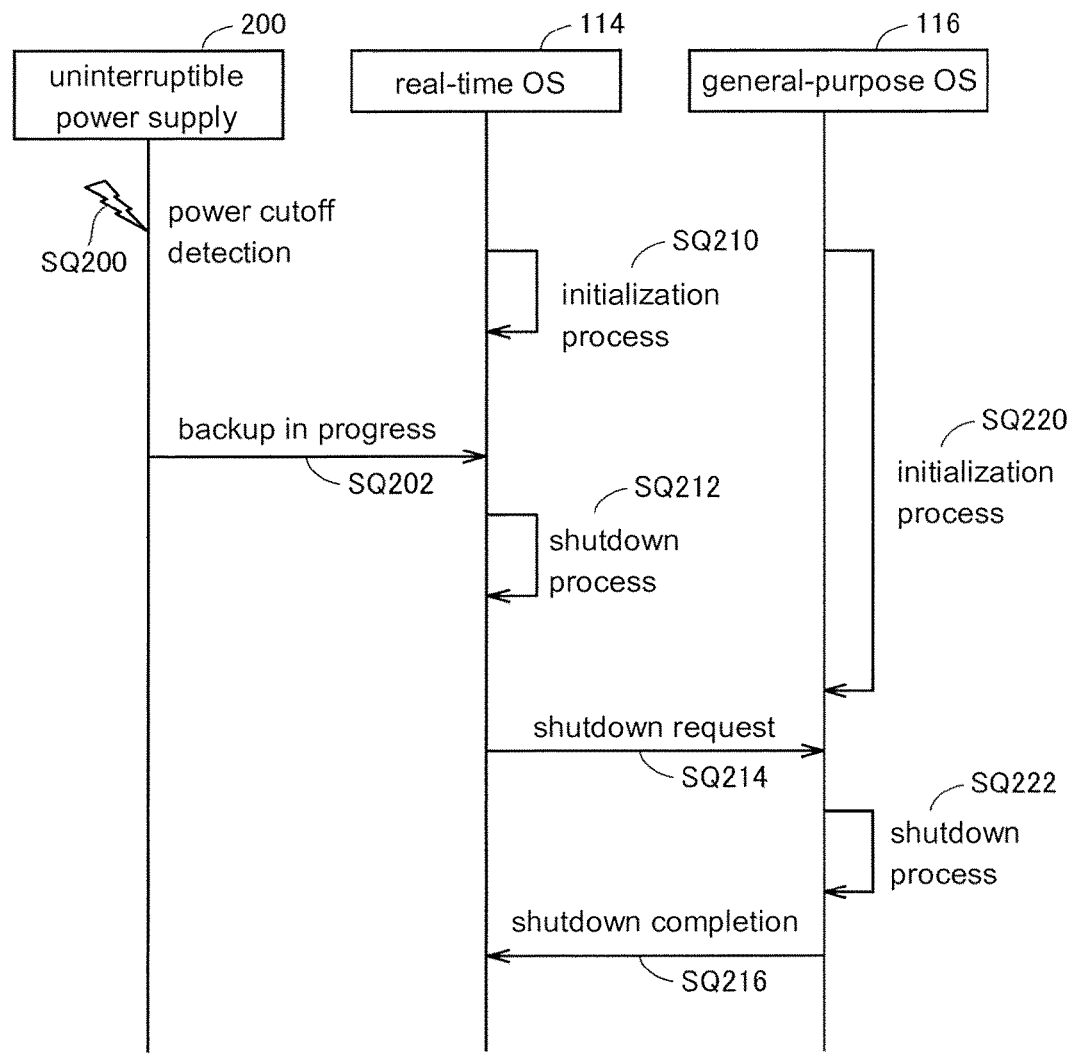
FIG. 10 is a sequence diagram showing a processing procedure in the control device according to the present embodiment in the case where the real-time OS is shifted to the shutdown process during startup.

FIG. 10 is a sequence diagram showing a processing procedure in the control device 100 according to the present embodiment in the case where the real-time OS 114 is shifted to the shutdown process during startup. With reference to FIG. 10, it is assumed that the real-time OS 114 and the general-purpose OS 116 have respectively started an initialization process (sequences SQ210 and SQ220). If the power supply from the external power supply to the uninterruptible power supply device 200 is stopped (power cutoff) (sequence SQ200) immediately after the start of the initialization process, the uninterruptible power supply device 200 outputs a shutdown instruction (notification of backup in progress) to the control device 100 (sequence SQ202).

The real-time OS 114 receives the shutdown instruction from the uninterruptible power supply device 200 to start the shutdown process (sequence SQ212), and waits for completion of the initialization process of the general-purpose OS 116 to output a shutdown request to the general-purpose OS 116 (sequence SQ214).

When the general-purpose OS 116 executes the shutdown process (sequence SQ222) and the completion notification thereof is outputted to the real-time OS 114 (sequence SQ224), the series of shutdown processes is completed.

In FIG. 10, the shutdown process in the real-time OS 114 is illustrated concisely to facilitate the explanation. In practice, it is preferable to execute the power cutoff process as shown in FIG. 5.

(2) Shutdown Process Before Startup of the General-Purpose OS 116

For example, if the system is erroneously started up during maintenance work or use of an incorrect production recipe is noticed, the shutdown process may be started by the user's operation before startup. In order to safely stop the control device 100, the necessary shutdown process is executed. In this case, because the user program 118 is not executed, control of the equipment or machine is not started.

In these cases, the real-time OS 114 is also capable of detecting the event in the same manner as the aforementioned shutdown process that is performed during operation. However, if the general-purpose OS 116 is being started up, the real-time OS 114 waits for completion of the startup of the general-purpose OS 116 to start the shutdown process. In the control device 100, because the real-time OS 114 leads the shutdown process, it is preferable that the shutdown process for the general-purpose OS 116 is executed after the startup is completed, instead of during system startup.

Figure 11:
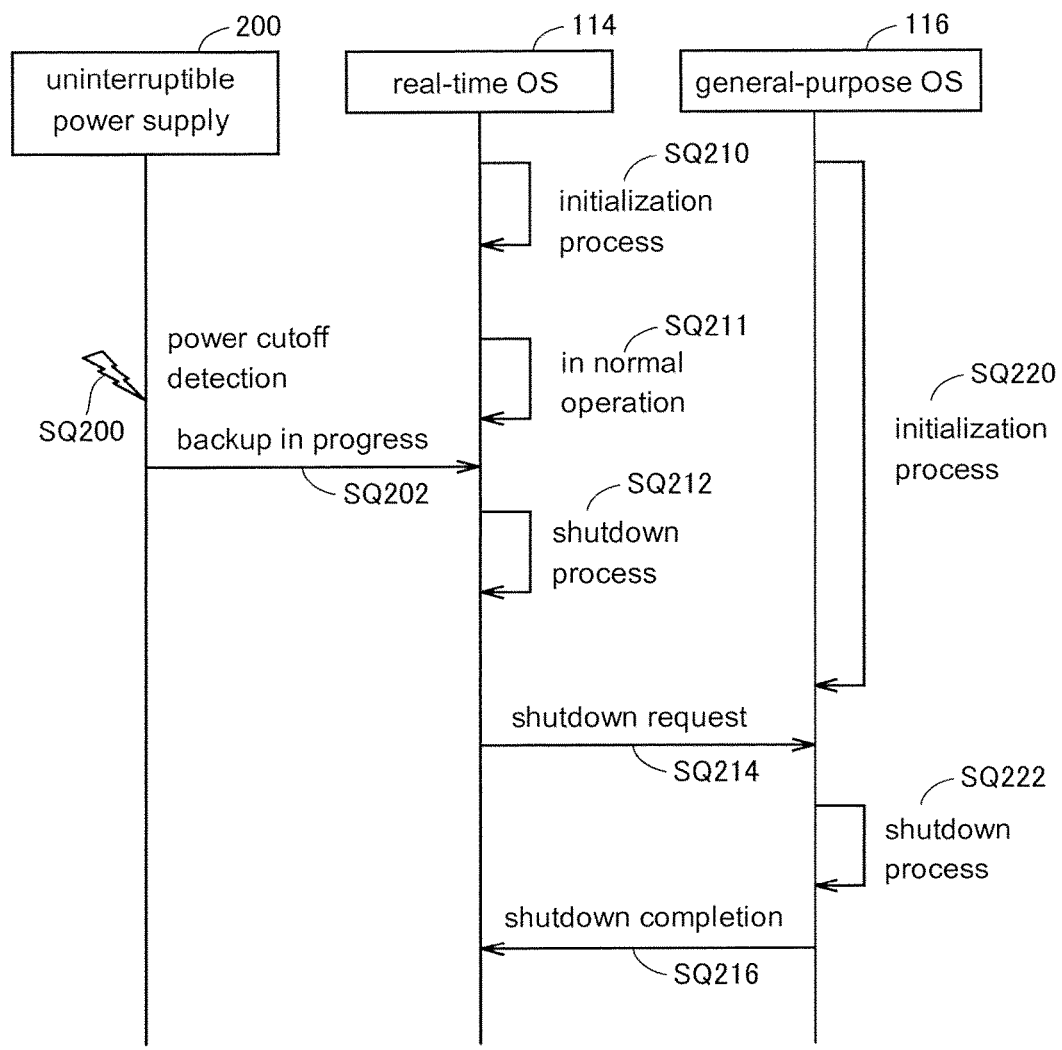
FIG. 11 is a sequence diagram showing a processing procedure in the control device according to the present embodiment in the case where the general-purpose OS is shifted to the shutdown process during startup.

FIG. 11 is a sequence diagram showing a processing procedure in the control device 100 according to the present embodiment in the case where the general-purpose OS 116 is shifted to the shutdown process during startup. With reference to FIG. 11, it is assumed that the real-time OS 114 and the general-purpose OS 116 have respectively started the initialization process (sequences SQ210 and SQ220). Then, it is assumed that the initialization process of the real-time OS 114 is completed first and the normal operation state has been reached (sequence SQ211). With respect to the general-purpose OS 116, on the other hand, if the power supply from the external power supply to the uninterruptible power supply device 200 is stopped (power cutoff) during execution of the initialization process (sequence SQ200), the uninterruptible power supply device 200 outputs the shutdown instruction (notification of backup in progress) to the control device 100 (sequence SQ202).

The real-time OS 114 receives the shutdown instruction from the uninterruptible power supply device 200 to start the shutdown process (sequence SQ212), and waits for completion of the initialization process of the general-purpose OS 116 to output the shutdown request to the general-purpose OS 116 (sequence SQ214).

When the general-purpose OS 116 executes the shutdown process (sequence SQ222) and the completion notification thereof is outputted to the real-time OS 114 (sequence SQ224), the series of shutdown processes is completed.

In FIG. 11, the shutdown process in the real-time OS 114 is illustrated concisely to facilitate the explanation. In practice, the power cutoff process as shown in FIG. 5 is executed.

FIG. 10 and FIG. 11 illustrate an example that the shutdown process is started in response to the shutdown instruction (notification of backup in progress) from the uninterruptible power supply device 200. Nevertheless, the shutdown process is executed by the same processing procedure when the user presses the power button 128 of the control device 100.

As described above, in the control device 100 according to the present embodiment, the shutdown process can be safely and reliably completed even during startup of the real-time OS 114 or the general-purpose OS 116.

F. Modified Example

The following modified example is applicable to the embodiment described above.

(f1: Process According to the Remaining Capacity of the Uninterruptible Power Supply Device 200)

A chargeable capacity of the power storage device built in the uninterruptible power supply device 200 decreases due to deterioration. Therefore, information such as the remaining capacity (or lifetime) from the uninterruptible power supply device 200 may be acquired so as to adjust the timeout times.

Specifically, the real-time OS 114 may acquire the remaining capacity from the uninterruptible power supply device 200 periodically or based on an event (for example, when the power is cut off), and based on the acquired information, estimate the maximum time allowable for the entire shutdown process and dynamically determine the timeout times Tu and Tw according to the estimated maximum time.

Even when the user has set the timeout times Tu and Tw in advance, if the timeout times determined based on the information from the uninterruptible power supply device 200 are longer, the longer timeout times may be adopted.

Information that can be used to estimate the lifetime (for example, accumulated operation time, etc.) may be used, instead of the remaining capacity, to serve as the information from the uninterruptible power supply device 200.

(f2: Shutdown Caused by the Power Button)

In the shutdown process caused by the power button 128, in principle, it is guaranteed that the power supply is continued, unlike the shutdown process caused by the uninterruptible power supply device 200. Therefore, processing for stopping the equipment or machine more safely and reliably may be executed.

In addition, if the user does not directly press the power button 128 but some event is detected to stop the control device 100, the shutdown instruction may be given to the control device 100 from a higher-level server device, etc. In this case, the real-time OS 114 receives the shutdown instruction from the higher-level server device, etc. to execute the shutdown process in accordance with the same procedure as described above.

(f3: Switching of the Shutdown Process of the User Program)

In the case where the maximum time allowable for execution of the shutdown process may vary due to the information, etc., from the uninterruptible power supply device 200, information on the allowable maximum time may be outputted from the real-time OS 114 to the user program 118.

The user program 118 may be programmed so that one of a plurality of stop processing methods can be selected according to the length of the allowable maximum time. For example, for the equipment or machine that is at risk of damage due to the stop, a pattern for reducing the risk as much as possible (but the time required for the stop is long) and a pattern for stopping in a time as short as possible may be prepared, and one of the patterns may be selected based on the information on the allowable maximum time from the real-time OS 114. For example, acceleration at the time of decelerating a motor may be set in a plurality of stages to be switched appropriately according to the length of the allowable maximum time.

(f4: Shutdown Process for a Plurality of OSs or Processes)

In the above description, the configuration in which the real-time OS 114 instructs the general-purpose OS 116 to shut down has been exemplified. Nevertheless, the real-time OS 114 may also instruct a plurality of OSs or processes executed by the control device 100 to carry out the shutdown process.

For example, the real-time OS 114 may instruct a database management process, a software HMI (human machine interface) or the like, which is being executed in the real-time OS 114 or other OSs, to carry out the shutdown process. Such an instruction of the shutdown process is executed automatically when the user has set the target in advance. For example, by shutting down the database management process beforehand, data can be prevented from being destroyed. The software HMI may appropriately switch the display content of the operation screen during the shutdown process when receiving the instruction of the shutdown process.

(f5: Monitoring Process/Operation of the General-Purpose OS from the Real-Time OS)

In above description, the configuration in which the real-time OS 114 outputs the shutdown request to the general-purpose OS 116 has been exemplified. However, in addition to the above, a function for monitoring the state of the general-purpose OS 116 may be implemented. The state of the general-purpose OS 116 to be monitored includes:

The general-purpose OS 116 is being updated

An operation state of the general-purpose OS 116

Content of the event log of the general-purpose OS 116

A device operation state in the general-purpose OS 116

The real-time OS 114 may notify the higher-level computer of the state of the general-purpose OS 116 that has been collected. In this case, the higher-level computer analyzes the collected information.

Moreover, the real-time OS 114 may instruct the general-purpose OS 116 to carry out processes other than the shutdown process. The processes include startup or re-startup of the general-purpose OS 116, startup of the application on the general-purpose OS 116, notification to the outside via the general-purpose OS 116, execution of periodic processes in the general-purpose OS 116, installation or uninstallation of the application on the general-purpose OS 116, and so on, for example.

(f6: Monitoring of Units Connected to the Control Device 100)

The real-time OS 114 may monitor a unit connected to the control device 100. For example, functions such as monitoring the state of the unit, collecting events generated by the unit, and diagnosing the unit may be executed together. The computer may be notified of the results of such monitoring and diagnosis.

(f7: Trigger of the Shutdown Process)

The above embodiment illustrates an example where the shutdown process is started due to the uninterruptible power supply device 200 or the power button 128. Nevertheless, it is also possible to receive an earthquake warning, etc., and use the earthquake warning as a trigger to start the shutdown process.

G. Benefits

According to the control device of the present embodiment, the real-time OS and the general-purpose OS are executed in parallel by using common hardware resources, so as to ensure stable execution of the user program for controlling the equipment or machine as well as realize cost reduction through simplification of the hardware resources. Furthermore, by adopting the general-purpose OS, a system that requires advanced information processing can be realized with fewer man-hours.

In addition, according to the control device of the present embodiment, when the cutoff event occurs, the real-time OS takes the initiative to shut down the user program executed on the real-time OS and the general-purpose OS. Thus, the possibility of destroying the data can be reduced and the shutdown process can be realized reliably.

The embodiment disclosed herein is exemplary in all respects and should not be construed restrictive. The scope of the disclosure is defined by claims instead of the above description, and it is intended to include all modifications within the scope of the claims and the equivalents thereof.

What is claimed is:

1. A control device that controls an equipment or a machine, the control device comprising:
   one or more processors;
   a general-purpose operating system and a real-time operating system executed in parallel and individually on the one or more processors, wherein the real-time operating system provides an execution environment of a user program to realize a control over the equipment or the machine; and
   an input interface receiving a cutoff event from outside, wherein the real-time operating system has:
   a function of executing a shutdown preparation process required for a shutdown of the real-time operating system in response to the cutoff event;
   a function of instructing the general-purpose operating system to shut down after executing the shutdown preparation process; and
   a function of completing the shutdown of the real-time operating system and cutting off a power supply of the control device when a first predetermined condition is satisfied, wherein the first predetermined condition comprises a receipt of a notification of shutdown completion from the general-purpose operating system.

2. The control device according to claim 1, wherein the real-time operating system cuts off the power supply of the control device without receiving the notification of shutdown completion from the general-purpose operating system when a first predetermined period has passed since the general-purpose operating system is instructed to shut down.

3. The control device according to claim 1, wherein the input interface is configured to receive the cutoff event that an uninterruptible power supply device supplying a power supply to the control device issues, when an external power supply supplied to the uninterruptible power supply device is lost, and
   the real-time operating system further has a function of notifying the uninterruptible power supply device that the shutdown of the real-time operating system has been completed.

4. The control device according to claim 1, wherein the real-time operating system further has a function of allowing the user program to refer to an information indicating whether the cutoff event has been received.

5. The control device according to claim 1, wherein the real-time operating system executes the shutdown preparation process after the cutoff event is received when a second predetermined condition is satisfied, wherein the second predetermined condition comprises receiving a prescribed notification from the user program.

6. The control device according to claim 1, wherein the real-time operating system starts the shutdown preparation process when a second predetermined period has passed since the user program is instructed to shut down.

7. A control method for a control device that controls an equipment or a machine, the control method comprising:
   a process of executing in parallel and individually a general-purpose operating system and a real-time operating system on one or more processors, wherein the real-time operating system provides an execution environment of a user program to realize a control over the equipment or the machine;
   a process that the real-time operating system executes a shutdown preparation process required for a shutdown of the real-time operating system in response to a cutoff event received via an input interface;
   a process that the real-time operating system instructs the general-purpose operating system to shut down after executing the shutdown preparation process; and
   a process that the real-time operating system completes the shutdown of the real-time operating system and cuts off a power supply of the control device when a first predetermined condition is satisfied, wherein the first predetermined condition comprises a receipt of a notification of shutdown completion from the general-purpose operating system.

8. A program comprising a real-time operating system that constructs an environment for controlling equipment or a machine according to a user program prepared in advance,
   wherein the real-time operating system is executed in parallel and individually with a general-purpose operating system on one or more processors, and
   the program enables a computer to execute:
   a process of executing a shutdown preparation process required for a shutdown of the real-time operating system in response to a cutoff event received via an input interface;
   a process of instructing the general-purpose operating system to shut down after executing the shutdown preparation process; and
   a process of completing the shutdown of the real-time operating system and cutting off power supply when a first predetermined condition is satisfied, wherein the first predetermined condition comprises receipt of a notification of shutdown completion from the general-purpose operating system.

* * * * *